United States Patent
Lee et al.

(10) Patent No.: US 11,395,205 B2
(45) Date of Patent: Jul. 19, 2022

(54) METHOD AND APPARATUS FOR PERFORMING DC BASED HANDOVER

(71) Applicant: LG ELECTRONICS INC., Seoul (KR)

(72) Inventors: Yejee Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 16/956,551

(22) PCT Filed: Feb. 11, 2019

(86) PCT No.: PCT/KR2019/001615
§ 371 (c)(1),
(2) Date: Jun. 19, 2020

(87) PCT Pub. No.: WO2019/160281
PCT Pub. Date: Aug. 22, 2019

(65) Prior Publication Data
US 2022/0141748 A1    May 5, 2022

Related U.S. Application Data

(60) Provisional application No. 62/630,251, filed on Feb. 14, 2018.

(51) Int. Cl.
*H04W 4/00* (2018.01)
*H04W 36/30* (2009.01)
*H04W 12/04* (2021.01)

(52) U.S. Cl.
CPC .......... *H04W 36/30* (2013.01); *H04W 12/04* (2013.01)

(58) Field of Classification Search
CPC ............................ H04W 36/30; H04W 12/04
USPC ........................................................ 370/331
See application file for complete search history.

(56) References Cited

U.S. PATENT DOCUMENTS

| | | | |
|---|---|---|---|
| 10,111,106 B2* | 10/2018 | Martin | H04W 72/0453 |
| 10,448,289 B2* | 10/2019 | Tenny | H04W 36/0027 |
| 10,841,807 B2* | 11/2020 | Martin | H04W 72/0453 |
| 10,863,394 B2* | 12/2020 | Kim | H04W 76/27 |
| 10,966,126 B2* | 3/2021 | Kim | H04W 28/08 |
| 2016/0338134 A1 | 11/2016 | Nagasaka et al. | |

(Continued)

OTHER PUBLICATIONS

PCT International Application No. PCT/KR2019/001615, International Search Report dated Apr. 9, 2019, 2 pages.

(Continued)

*Primary Examiner* — Amancio Gonzalez
(74) *Attorney, Agent, or Firm* — Lee Hong Degerman Kang Waimey

(57) ABSTRACT

Provided are a method for performing, by a user equipment (UE), a role change between a primary cell and a secondary cell in a wireless communication system, and an apparatus supporting the same. The method may include: receiving a configuration and a condition for triggering the role change between the primary cell and the secondary cell; configuring a source cell as the primary cell and a target cell as the secondary cell; determining whether or not the condition is satisfied; and when it is determined that the condition is satisfied, configuring the target cell as the primary cell and the source cell as the secondary cell based on the configuration.

13 Claims, 18 Drawing Sheets

(56) References Cited

U.S. PATENT DOCUMENTS

2018/0020500 A1    1/2018  Pelletier et al.
2020/0022032 A1*   1/2020  Tenny ............... H04W 36/0016

OTHER PUBLICATIONS

Huawei et al., "SgNB to MgNB reconfiguration for 0ms interruption handover," 3GPP TSG-RAN WG2 Ad Hoc NR #2, R2-1706709, Qingdao, China, Jun. 27-29, 2017, 7 pages.
AT&T, "Support for intra-frequency dual connectivity in NR," 3GPP TSG-RAN WG2 NR Ad Hoc 1801, R2-1801216, Vancouver, Canada, Jan. 22-26, 2018, 6 pages.
Huawei et al., "Analysis of solutions in LTE for 0ms interruption," 3GPP TSG-RAN WG2 NR Ad Hoc 0118, R2-1800551, Vancouver, Canada, Jan. 22-26, 2018, 5 pages.

* cited by examiner

METHOD AND APPARATUS FOR PERFORMING DC BASED HANDOVER

CROSS-REFERENCE TO RELATED APPLICATIONS

This application is the National Stage filing under 35 U.S.C. 371 of International Application No. PCT/KR2019/001615, filed on Feb. 11, 2019, which claims the benefit of U.S. Provisional Application No. 62/630,251, filed on Feb. 14, 2018, the contents of which are all hereby incorporated by reference herein in their entirety.

BACKGROUND OF THE DISCLOSURE

Field of the Disclosure

The present invention relates to a wireless communication system, and more particularly, to a method for performing dual connectivity (DC) based handover in a wireless communication system and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

Meanwhile, in dual connectivity (DC) based handover, several issues can be considered. If the UE reports the measurement report when the serving cell is lower than target cell or a threshold, the MgNB is likely to be dropped before the role change. If the UE reports the measurement report when the target cell is higher than a threshold, the role change can be performed even the channel quality of PCell is better than PSCell. Also, there is no event which can compare the PCell and PSCell, currently. Therefore, a method for performing conditional role change in a dual connectivity and an apparatus supporting the same need to be proposed.

SUMMARY OF THE DISCLOSURE

One embodiment provides a method for performing, by a user equipment (UE), a role change between a primary cell and a secondary cell in a wireless communication system. The method may include: receiving a configuration and a condition for triggering the role change between the primary cell and the secondary cell; configuring a source cell as the primary cell and a target cell as the secondary cell; determining whether or not the condition is satisfied; and when it is determined that the condition is satisfied, configuring the target cell as the primary cell and the source cell as the secondary cell based on the configuration.

Another embodiment provides a user equipment (UE) performing a role change between a primary cell and a secondary cell in a wireless communication system. The UE may include: a transceiver; at least one processor; and at least one computer memory operably connectable to the at least one processor and storing instructions that, when executed, cause the at least one processor to perform operations comprising: receiving a configuration and a condition for triggering the role change between the primary cell and the secondary cell; configuring a source cell as the primary cell and a target cell as the secondary cell; determining whether or not the condition is satisfied; and when it is determined that the condition is satisfied, configuring the target cell as the primary cell and the source cell as the secondary cell based on the configuration.

Another embodiment provides a method for performing, by a base station, a role change between a primary cell and a secondary cell in a wireless communication system. The method include: transmitting a configuration and a condition for triggering the role change between the primary cell and the secondary cell, to a user equipment, wherein the configuration includes a first configuration and a second configuration, wherein the first configuration is a configuration for configuring a target cell as the secondary cell, and wherein the second configuration is a configuration for configuring a source cell as the secondary cell and the target cell as the primary cell; configuring the source cell as the primary cell and the target cell as the secondary cell based on the first configuration; and configuring the target cell as the primary cell and the source cell as the secondary cell based on the second configuration and the condition.

Signaling overhead can be reduced in the DC-based handover.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
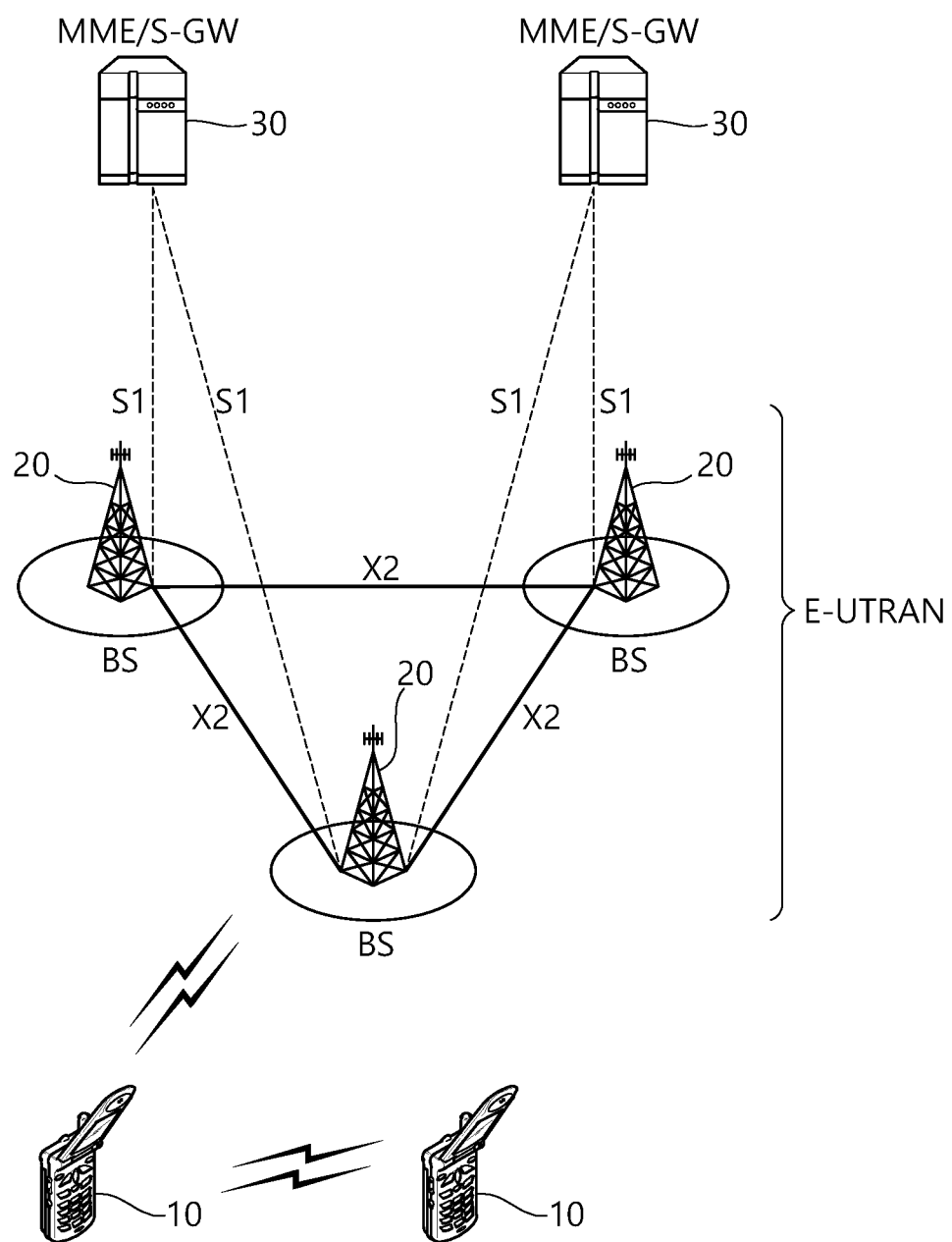
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
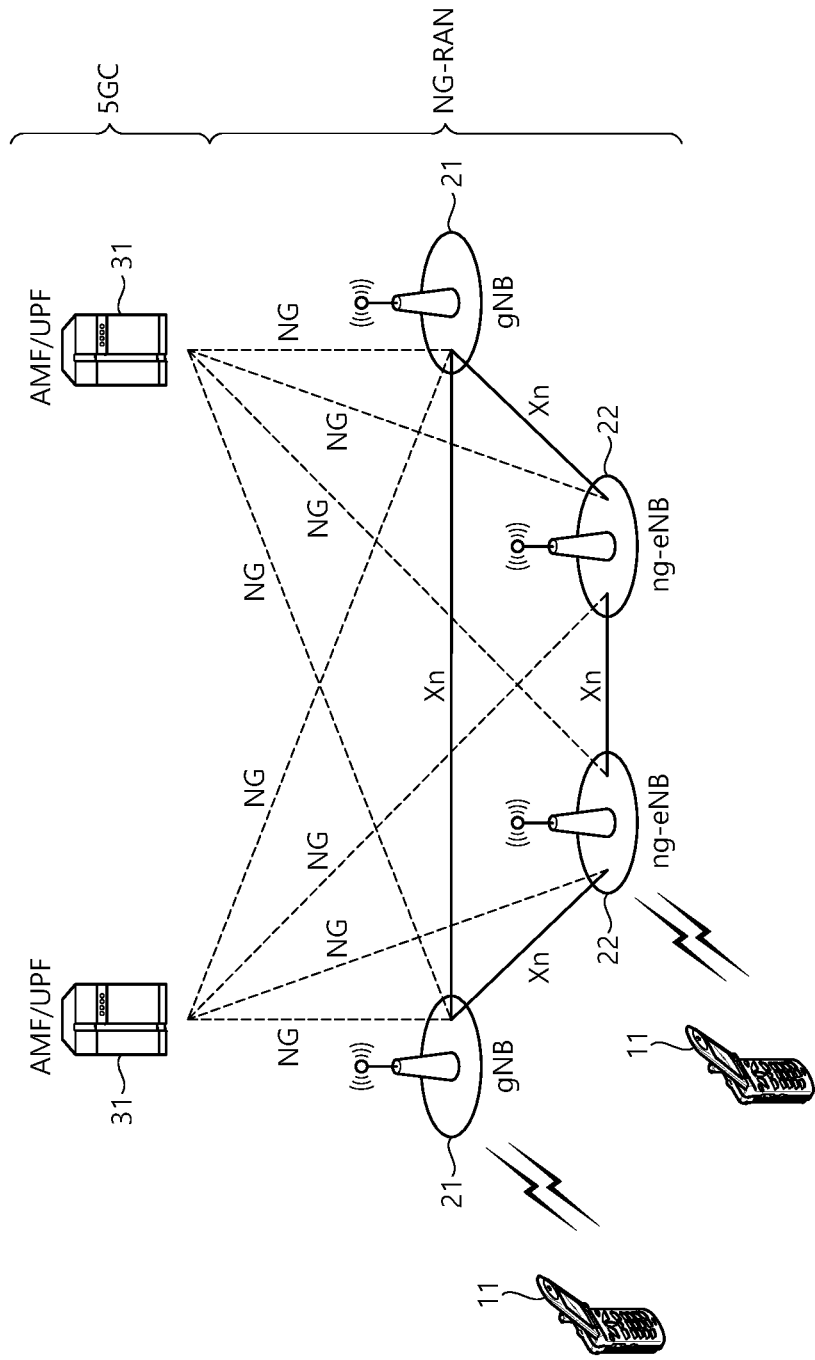
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
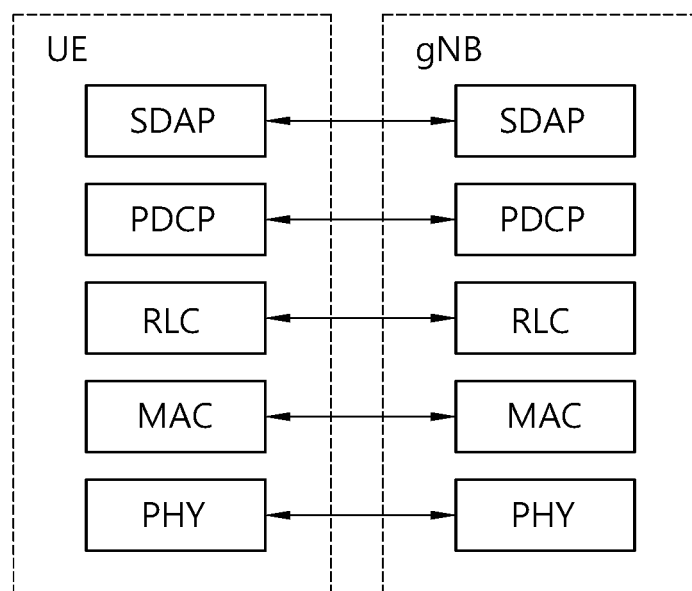
FIG. 3 shows a block diagram of a user plane protocol stack to which technical features of the present invention may be applied.
Figure 4:
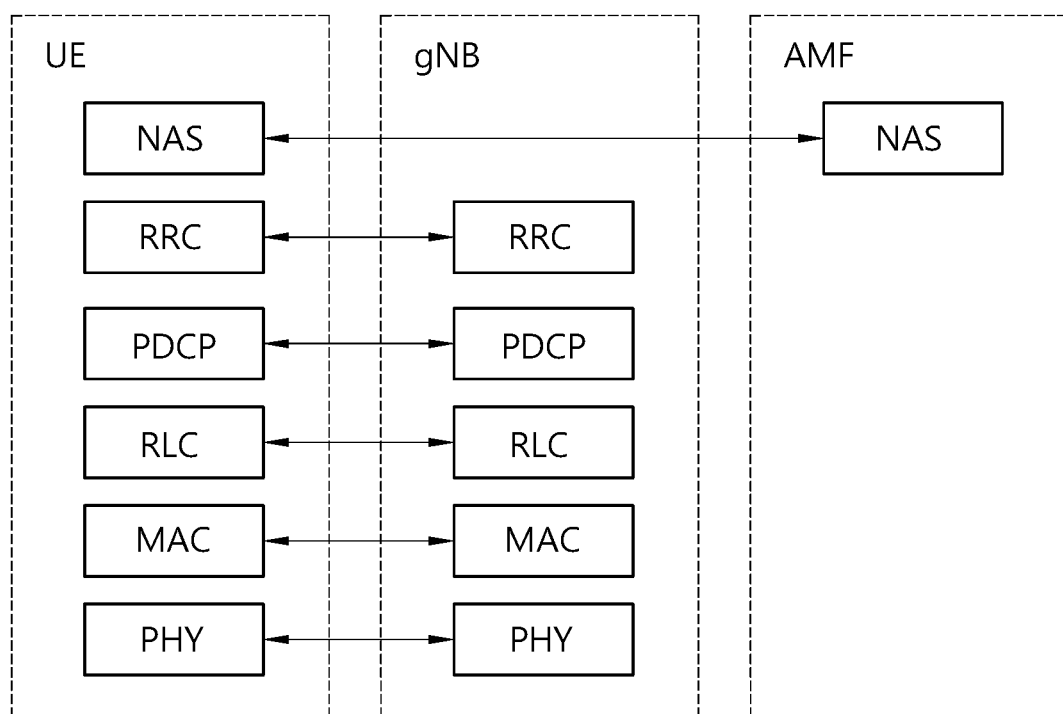
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
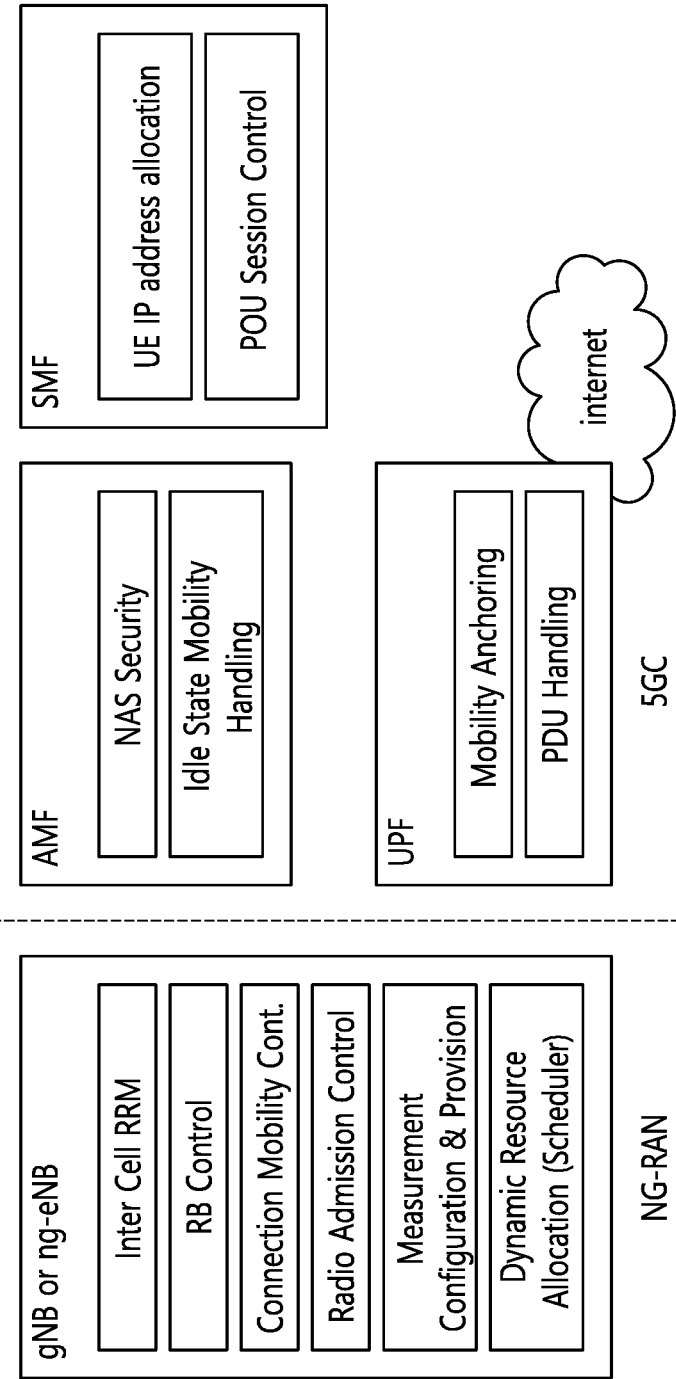
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or O&M);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) may host the following main functions:

NAS signalling termination;

NAS signalling security;

AS Security control;

Inter CN node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

SMF selection.

The User Plane Function (UPF) may host the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink Traffic verification (SDF to QoS flow mapping);

Downlink packet buffering and downlink data notification triggering.

The Session Management function (SMF) may host the following main functions:

Session Management;
UE IP address allocation and management;
Selection and control of UP function;
Configures traffic steering at UPF to route traffic to proper destination;
Control part of policy enforcement and QoS;
Downlink Data Notification.

Hereinafter, measurements will be described.

A network may configure an RRC_CONNECTED UE to perform measurements and report them in accordance with the measurement configuration. The measurement configuration may be provided by means of dedicated signaling, e.g., using an RRC reconfiguration.

The network may configure the UE to perform the following types of measurements:

NR measurements;
Inter-RAT measurements of E-UTRA frequencies.

The network may configure the UE to report the following measurement information based on SS/PBCH block(s):

Measurement results per SS/PBCH block;
Measurement results per cell based on SS/PBCH block(s);
SS/PBCH block(s) indexes.

The network may configure the UE to report the following measurement information based on CSI-RS resources:

Measurement results per CSI-RS resource;
Measurement results per cell based on CSI-RS resource(s);
CSI-RS resource measurement identifiers.

The measurement configuration includes the following parameters:

(1) Measurement objects: A list of objects on which the UE shall perform the measurements.

(2) Reporting configurations: A list of reporting configurations where there can be one or multiple reporting configurations per measurement object. Each reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

(3) Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement obj ect. The measurement identity is also included in the measurement report that triggered the reporting, serving as a reference to the network.

(4) Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

(5) Measurement gaps: Periods that the UE may use to perform measurements, i.e. no (UL, DL) transmissions are scheduled.

A UE in RRC_CONNECTED maintains a measurement object list, a reporting configuration list, and a measurement identities list according to signaling and procedures in this specification. The measurement object list possibly includes NR measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

Hereinafter, a handover procedure will be described.

Figure 6A:
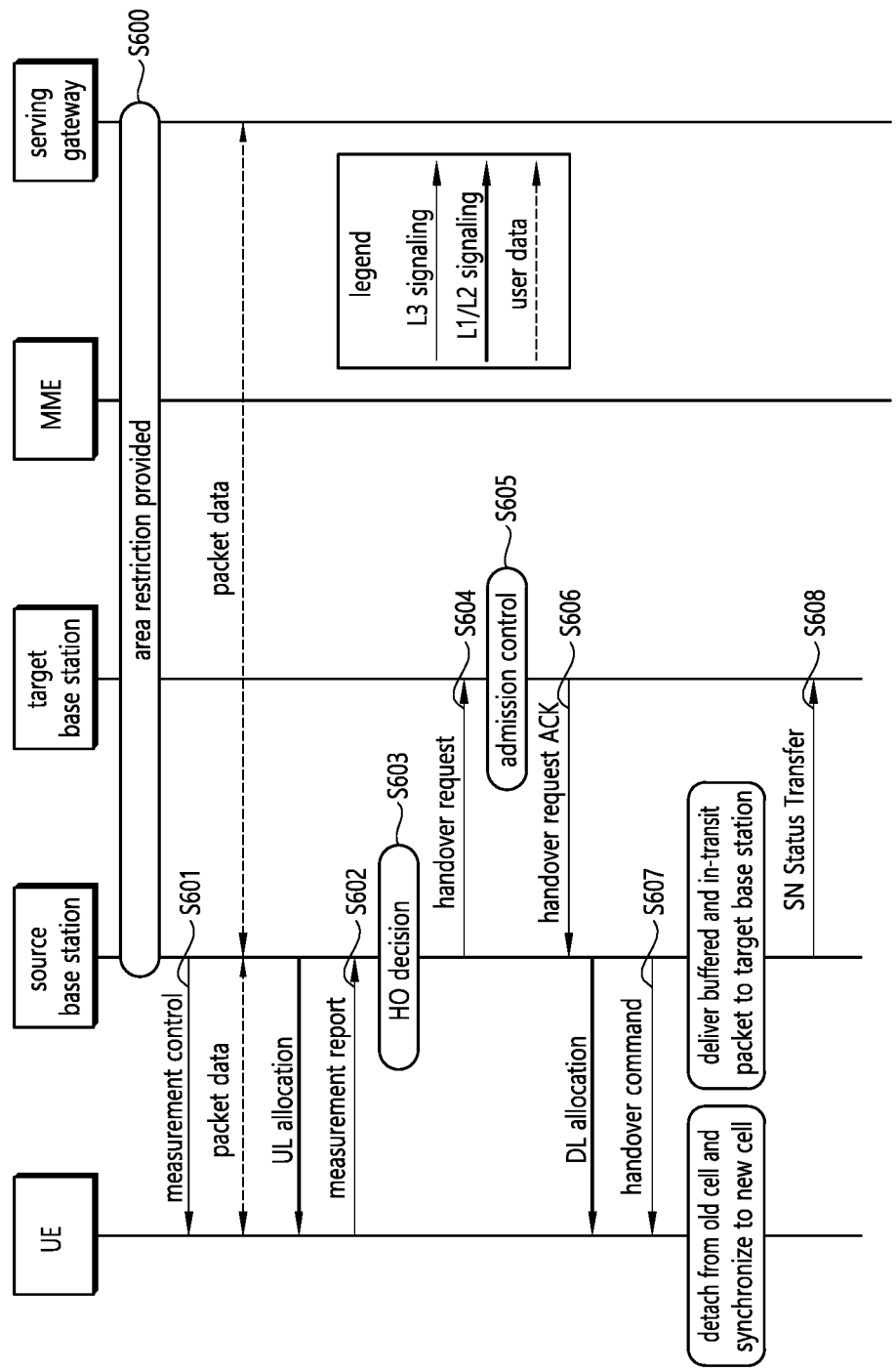
FIGS. 6a and 6b show an example of a handover procedure to which technical features of the present invention may be applied.
Figure 6B:
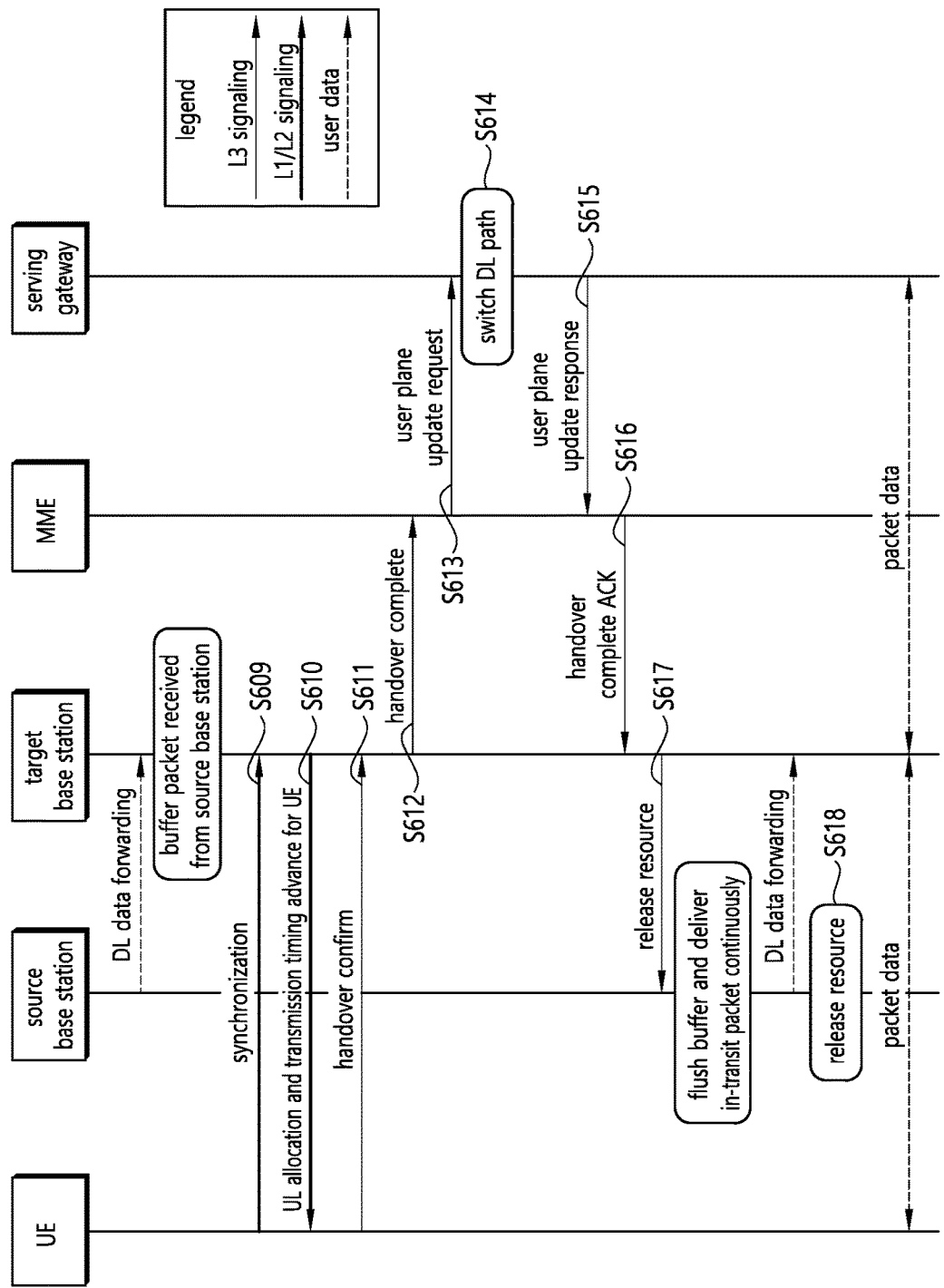

FIGS. 6a and 6b show an example of a handover procedure to which technical features of the present invention may be applied. Specifically, FIGS. 6a and 6b show a handover procedure when an MME and an S-GW are not changed. The handover procedure is described below in detail.

Referring to FIG. 6a, in step S600, a UE context within a source base station may include information regarding a roaming restriction provided either at connection establishment or at the last tracking area (TA) update.

In step S601, the source base station may configure UE measurement procedures according to access restriction information. Measurements provided by the source base station may assist a function controlling UE's connection mobility.

In step S602, a measurement report may be triggered and transmitted to the base station.

In step S603, the source base station may make decision based on the measurement report and radio resource management (RRM) information to hand off the UE.

In step S604, the source base station may transmit information necessary for handover to a target base station through a handover request message. The information necessary for handover may include a UE X2 signalling context reference, a UE S1 EPC signalling context reference, a target cell ID, an RRC context including a UE identifier (e.g., cell radio network temporary identifier (C-RNTI)) in the source base station, or the like.

In step S605, admission control may be performed by the target base station dependent on the received E-RAB QoS information to increase the likelihood of a successful handover, if resources can be granted by the target base station.

In step S606, the target base station may prepare a handover with L1/L2 and transmit a handover request ACK message to the source base station. The handover request ACK message may include a transparent container (RRC message) to be transmitted to the UE to perform the handover. The container may include a new C-RNTI and a target base station's security algorithm identifier. In addition, the container may further include some other parameters i.e. access parameters, SIBs, etc.

In step S607, the source base station may generate an RRC message (e.g., an RRC connection reconfiguration message) including mobility control information for the UE in order to perform the handover. The RRC connection reconfiguration message may include parameters necessary for the handover (e.g., new C-RNTI, target base station security algorithm identifier, and optionally dedicated RACH signature information, target base station SIB, etc.), and may command to perform the handover.

In step S608, the source base station may transmit a serial number (SN) status transfer message to the target base station to convey an uplink PDCP SN receiver status and a downlink PDCP SN transmitter status.

Referring to FIG. 6b, in step S609, after receiving the RRC connection reconfiguration message including the mobility control information, the UE may perform synchronization with the target base station and access a target cell through an RACH. If a dedicated RACH preamble is allocated, the RACH is performed in a contention-free manner, and otherwise, is performed in a contention-based manner.

In step S610, the target base station may respond with uplink allocation and timing advance.

In step S611, when the UE has successfully accessed the target cell, the UE may transmit an RRC connection reconfiguration complete message (C-RNTI) to confirm the handover, along with an uplink buffer status report, to inform the target base station that the handover procedure is complete. The target base station may verify the C-RNTI transmitted in the RRC connection reconfiguration complete message. The target base station can now begin transmitting data to the UE.

In step S612, the target base station may transmit a path switch request message to an MME to inform that the UE has changed a cell.

In step S613, the MME may transmit a user plane update request message to an S-GW.

In step S614, the S-GW may switch a downlink data path to a target side. The S-GW may transmit an end marker packet on the old path to the source base station and thereafter may release a user plane/TNL resource towards the source base station.

In step S615, the S-GW may transmit a user plane update response message to the MME.

In step S616, the MME may respond to the path switch request message by using a path switch request ACK message.

In step S617, by transmitting a UE context release message, the target base station may inform a success of the handover to the source base station and may trigger the release of resources by the source base station.

In step S618, upon reception of the UE context release message, the source base station may release a radio resource and a user plane related resource associated with the UE context.

Hereinafter, dual connectivity (DC) will be described.

Figure 7:
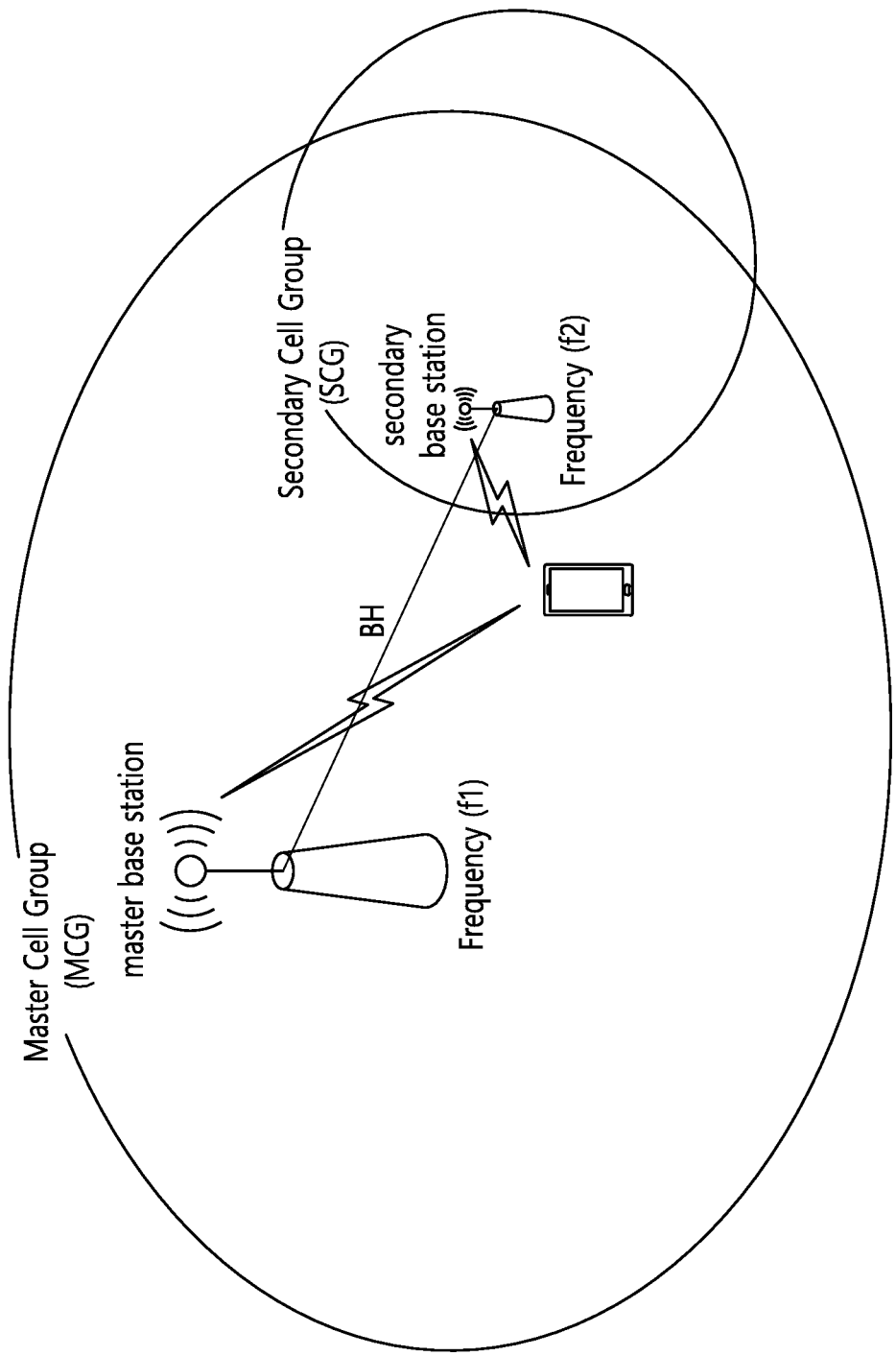
FIG. 7 shows a diagram for dual connectivity between a master cell group (MCG) and a secondary cell group (SCG) to which technical features of the present invention may be applied.

FIG. 7 shows a diagram for dual connectivity between a master cell group (MCG) and a secondary cell group (SCG) to which technical features of the present invention may be applied.

The dual connectivity (DC) means that the UE can be connected to both a master base station and a secondary base station at the same time. For instance, the master base station and the secondary base station may be eNBs. For instance, the master base station and the secondary base station may be gNBs. For instance, the master base station may be an eNB and the secondary base station may be a gNB. For instance, the master base station may be a gNB and the secondary base station may be an eNB. The MCG is a group of serving cells associated with the master base station, comprising of a PCell and optionally one or more SCells. And the SCG is a group of serving cells associated with the secondary base station, comprising of the special SCell and optionally one or more SCells.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the master base station via the frequency of f1, and the SCG is operated by the secondary base station via the frequency of f2. The frequency f1 and f2 may be equal. The backhaul interface (BH) between the master base station and secondary base station is non-ideal (e.g. X2 interface), which means that there is considerable delay in the backhaul and therefore the centralized scheduling in one node is not possible.

For SCG, the following principles are applied: i) at least one cell in SCG has a configured UL CC and one of them, named PSCell, is configured with PUCCH resources; ii) RRC connection Re-establishment procedure is not triggered; iii) for split bearers, the DL data transfer over the master base station is maintained; iv) PSCell cannot be de-activated; and v) PSCell can only be changed with SCG change (i.e. with security key change and RACH procedure).

With respect to the interaction between the master base station and the secondary base station, the following principles are applied: i) the master base station maintains the RRM measurement configuration of the UE and may, e.g, based on received measurement reports or traffic conditions or bearer types, decide to ask the secondary base station to provide additional resources (serving cells) for a UE; ii) upon receiving the request from the master base station, the secondary base station may create the container that will result in the configuration of additional serving cells for the UE (or decide that it has no resource available to do so); iii) for UE capability coordination, the master base station provides (part of) the AS configuration and the UE capabilities to the secondary base station; iv) the master base station and the secondary base station exchange information about UE configuration by means of RRC containers (inter-node messages) carried in X2 messages; v) the secondary base station may initiate a reconfiguration of its existing serving cells (e.g., PUCCH towards the secondary base station); vi) the secondary base station decides which cell is the PSCell within the SCG; and vii) the master base station does not change the content of the RRC configuration provided by the secondary base station.

Figure 8:
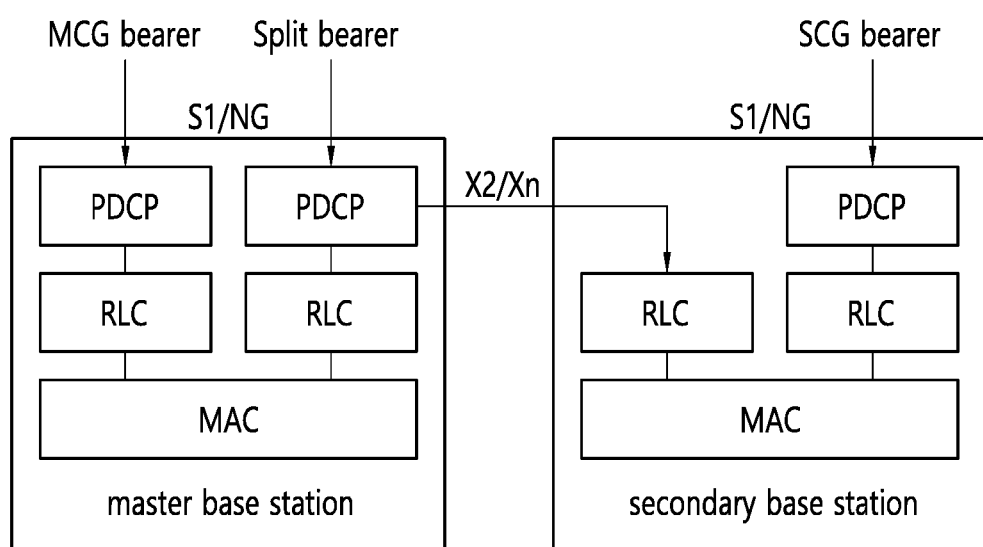
FIG. 8 shows a diagram for radio protocol architecture for dual connectivity to which technical features of the present invention may be applied.

FIG. 8 shows a diagram for radio protocol architecture for dual connectivity to which technical features of the present invention may be applied.

In the dual connectivity operation, the radio protocol architecture that a particular bearer uses depends on how the bearer is setup. Three alternatives exist, MCG bearer, split bearer and SCG bearer. Those three alternatives are depicted on FIG. 8. The SRBs (Signaling Radio Bearers) are always of the MCG bearer and therefore only use the radio resources provided by the master base station. The MCG bearer is a radio protocol only located in the master base station to use master base station resources only in the dual connectivity. And the SCG bearer is a radio protocol only located in the secondary base station to use secondary base station resources in the dual connectivity.

Specially, the split bearer is a radio protocol located in both the master base station and the secondary base station to use both master base station and secondary base station resources in the dual connectivity and the split bearer may be a radio bearer comprising one Packet Data Convergence Protocol (PDCP) entity, two Radio Link Control (RLC) entities and two Medium Access Control (MAC) entities for one direction.

Figure 9:
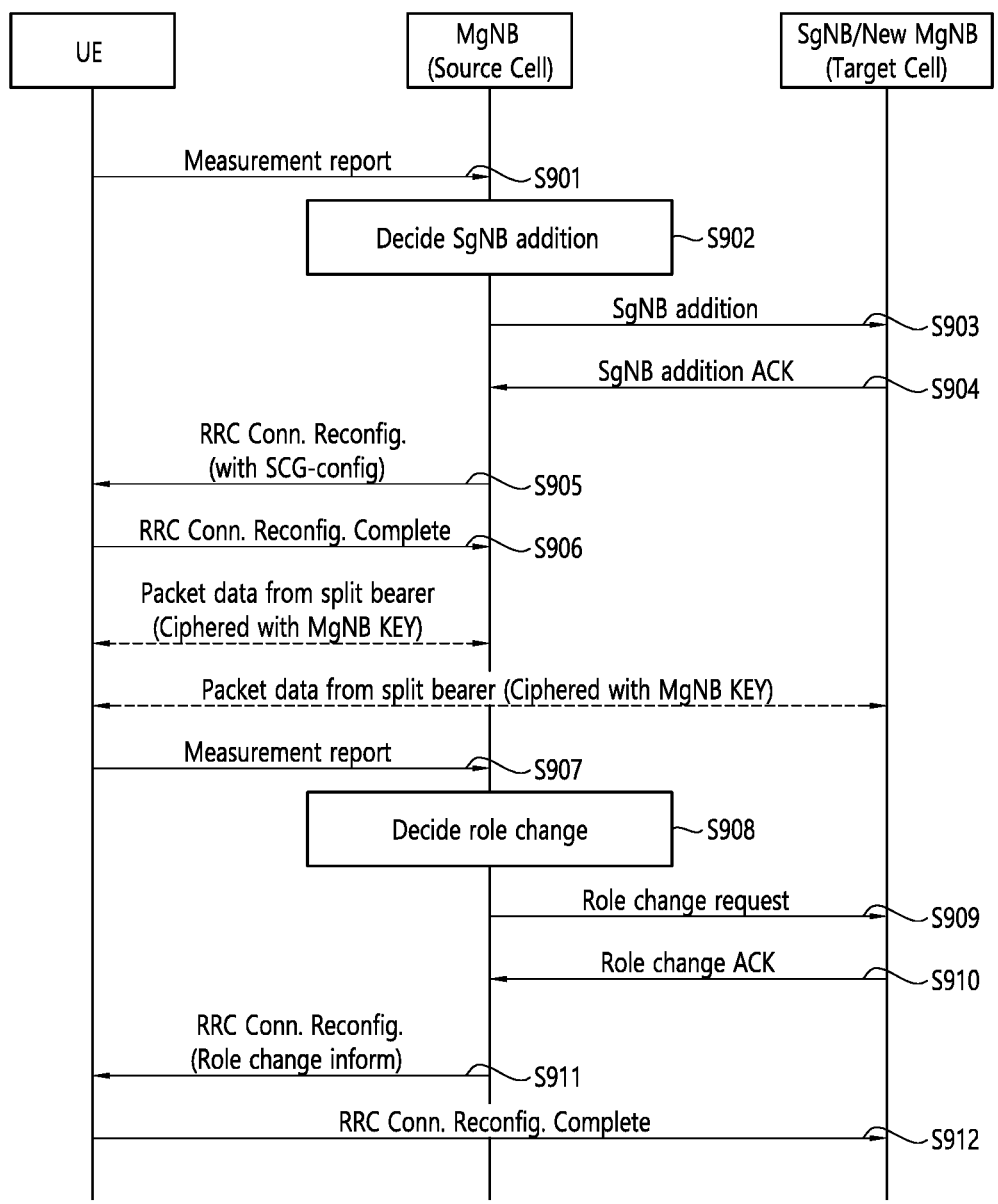
FIG. 9 shows a procedure for dual connectivity-based handover.

FIG. 9 shows a procedure for dual connectivity-based handover.

The dual connectivity is considered for 0 ms interruption handover. The sequence of 0 ms interruption handover with single cell is regarded as following steps.

Referring to FIG. 9, in step S901, a UE sends measurement report to a source gNB. In step S902, the source gNB decides to add a target gNB as a secondary node. In step S903, the source gNB sends a SgNB addition message to the target gNB. In step S904, the source gNB receives a SgNB addition acknowledge message from the target gNB. In step S905, the UE receives SCG configuration via a RRC connection reconfiguration message from the source gNB. Now, the source gNB becomes an MgNB. In step S906, the UE sends a RRC connection reconfiguration complete message to the MgNB. In step S907, optionally, the UE sends measurement report to the MgNB. In step S908, the MgNB decides role change. In step S909, the MgNB sends a role change request message to the SgNB. In step S910, the MgNB receives a role change acknowledge message from the SgNB. In step S911, the UE receives role change information via a RRC connection reconfiguration message. In step S912, the UE sends a RRC connection reconfiguration complete message to the SgNB. Now, the SgNB becomes a new MgNB.

Meanwhile, in above case, the role change is performed after the UE report the measurement report. However, according to timing of the measurement report, several issues can be considered.

Firstly, if the UE reports the measurement report when the serving cell is lower than target cell or a threshold, the MgNB is likely to be dropped before the role change. Especially, NR considers high frequency and beam forming, and channel quality of high frequency cells may be attenuated quickly. Thus, when gNB managing high frequency cells sends the role change request message and receives the role change acknowledge message, a radio link failure (RLF) would be already occurred. So, the target cell may need to be added earlier and the role change should be performed quickly. However, sending the role change request message and receiving the role change acknowledge message is required for the role change.

Secondly, if the UE reports the measurement report when the target cell is higher than a threshold, the role change can be performed even the channel quality of PCell is better than PSCell. It may cause ping-pong and waste resources for signaling.

Thirdly, there is no event which can compare the PCell and PSCell, currently. So, if once the target cell is added as PSCell, it would be hard to compare the channel quality of source cell (i.e. PCell) and target cell (i.e. PSCell).

Therefore, a method for performing conditional role change in a dual connectivity and an apparatus supporting the same need to be suggested.

Figure 10:
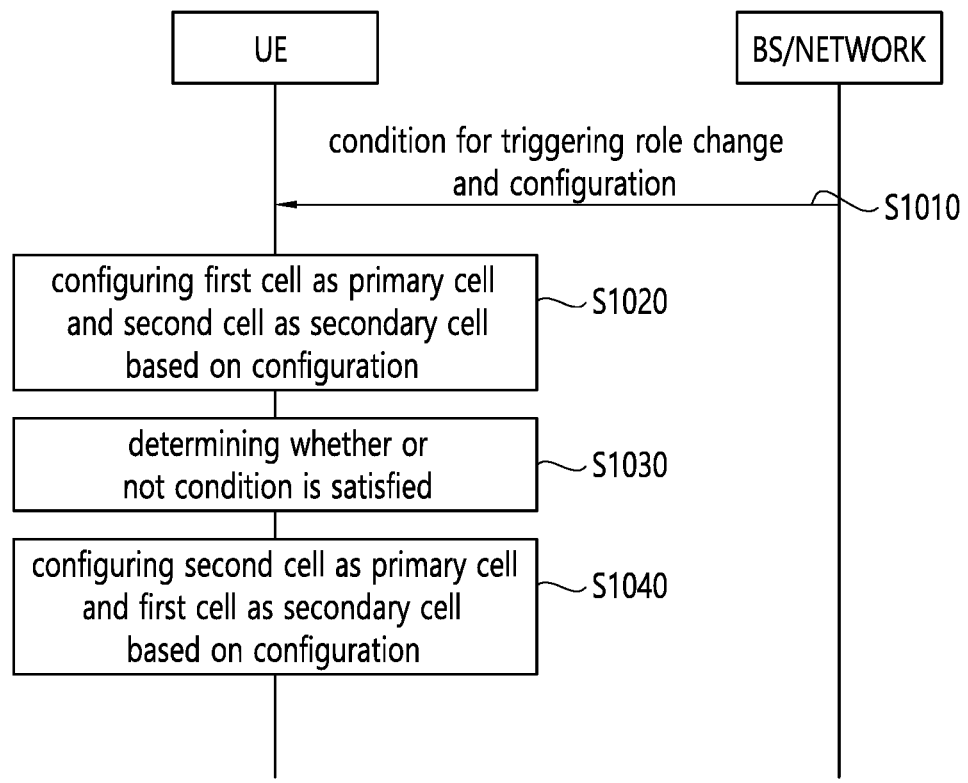
FIG. 10 shows a procedure for dual connectivity-based handover according to an embodiment of the present invention.

FIG. 10 shows a procedure for dual connectivity-based handover according to an embodiment of the present invention.

Referring to FIG. 10, in step S1010, the UE may receive a configuration. The configuration may be received from a mater base station or a secondary base station. The master base station may be a MeNB or a MgNB, and the secondary base station may be a SeNB or a SgNB. The configuration may include a first part of configuration and a second part of configuration. The first part of configuration may configure a second cell as a secondary cell.

The second part of configuration may configure a second cell as a primary cell while configuring a first cell as a secondary cell. The primary cell may be a PCell, and the secondary cell may be PSCell or SCell. Desirably, the first part of configuration and the second part of configuration may be included in one message. For instance, the message may be a RRC reconfiguration message.

Further, in step S1010, the UE may receive a condition for triggering role change. The condition may be received from a mater base station or a secondary base station. Desirably, the condition may be included in the message.

In step S1020, the UE may configure the second cell as the secondary cell. Thus, the first cell may become the primary cell.

In step S1030, the UE may determine whether or not the condition is satisfied. If the UE determines that the condition is satisfied, the UE may send an uplink message initiating the second part of configuration to a network. The network may include the master base station or the secondary base station. For instance, when the condition is satisfied, the UE may send a role change complete message to the secondary base station with security key of the master base station. Alternatively, when the condition is satisfied, the UE may send a role change complete message to the master base station with security key of the master base station.

In step S1040, the UE may configure the second cell as the primary cell and the first cell as the secondary cell based on the second part of configuration after sending the uplink message to the network. Thus, a role can be changed between the first cell and the second cell based on the second part of configuration.

According to an embodiment of the present invention, an example of dual connectivity-based handover may include following steps:

(1) First step: the UE may receive one message including two parts of configuration and a condition. The first part of configuration may configure a target cell as the secondary cell. For instance, the first part of configuration may include a SCG configuration for configuring the secondary cell. The second part of configuration may include role change information. For instance, the role change information may be a new PDCP security key of the target cell which would be a new mater base station. The condition may include a role change trigger condition about comparison of channel quality between the primary cell and the secondary cell.

Specifically, according to an embodiment of the present invention, preparation time can be reduced during the role change for the handover. When the UE sends measurement report about the target cell, source base station would decide to add the target cell as secondary base station for DC based handover. Further, the UE may report the measurement report when the target cell is better than a threshold. So, the target cell could be added early even if the channel quality of source cell is better than the target cell. Also, the UE may receive one message which includes not only SgNB addition but also role change configuration and the condition of role change. The role change configuration may include new key. The new key may be a PDCP security key of the target cell which would be a new MgNB. If the UE received the new key of new MgNB earlier, the UE could apply the new key immediately after the UE notices the starting point. The role change trigger condition may be about comparison of channel quality between PCell and PSCell. According to prior art, there is no measurement event between PCell and PSCell. If the UE triggers role change and MgNB does not decide the timing of role change, the UE would compare the channel quality between the PCell and PSCell and trigger the role change. So, the additional event would not be required to be defined. When the UE receives the message, MgNB already sent a message to the SgNB to prepare role change with SgNB addition. This early preparation would reduce the preparation time during the actual role change.

(2) Second step: the UE may configure the target cell as the secondary cell based on the first part of configuration. Further, the UE may start to compare channel quality between the primary cell (i.e., source cell) and the secondary cell (i.e., target cell) as the received trigger condition. When the UE receives a RRC reconfiguration message, the UE may configure the target cell as PSCell with the first part of configuration and start to compare channel quality between PCell and PSCell as the received trigger condition. The UE may defer applying the second part of configuration until the role change completion is confirmed.

(3) Third step: when the trigger condition is satisfied, the UE may send a role change complete message to the secondary base station with a security key of the master base station. The master base station may receive a role change complete message from the secondary base station. Then, the secondary base station may become a new master base station, and the master base station may become a new secondary base station. If the master base station sends a reconfiguration message for changing configuration after the UE sends a role change complete message, the UE would not apply the changed configuration and send a RRC reconfiguration complete message with cause (e.g. "In progress").

Alternatively, when the trigger condition is satisfied, the UE may send a role change complete message to the master base station with a security key of the master base station. The master base station may send a role change complete message to the secondary base station. Then, the secondary base station may become a new master base station, and the master base station may become a new secondary base station.

(4) Fourth step: if the UE receives the control PDU with end-marker, the UE would apply the second part of configuration including new security key. After the UE sends the role change complete message, the new MgNB would start to send data which is ciphered with new security key and notify the sequence number (SN) of starting point in control PDU with end-marker. If the UE receives the control PDU with end-marker, the UE would apply the second part of configuration including new security key. An additional RRC reconfiguration message may be not required because the configuration is already prepared when previous SgNB is added. Therefore, according to an embodiment of the present invention, the time for role change can be reduced when the channel quality of the MgNB is getting worse.

According to an embodiment of the present invention, when the trigger condition is satisfied, the UE could send the role change complete message to the master base station (e.g. MgNB) or the secondary base station (e.g. SgNB). Hereinafter, according to an embodiment of the present invention, examples of dual connectivity-based handover procedure depending on a base station to which a role change complete message is transmitted.

Figure 11:
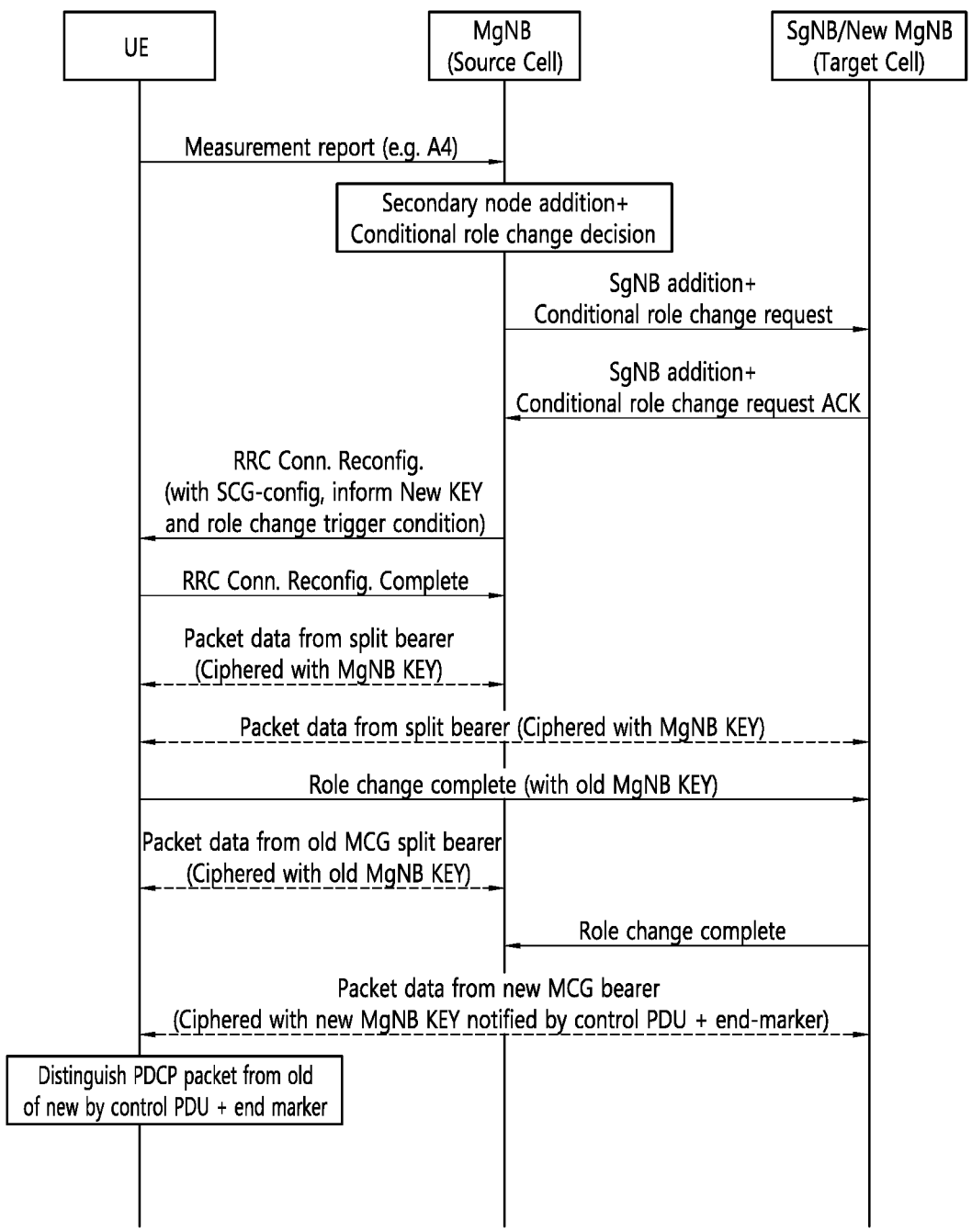
FIG. 11 shows a procedure for dual connectivity-based handover in case that the UE sends a role change complete message to a secondary base station, according to an embodiment of the present invention.

FIG. 11 shows a procedure for dual connectivity-based handover in case that the UE sends a role change complete message to a secondary base station, according to an embodiment of the present invention.

Referring to FIG. 11, the UE may send the role change complete message to the SgNB with MgNB security key. The MgNB may receive role change complete message from the SgNB. The SgNB becomes new MgNB and MgNB becomes new SgNB. In this case, the UE may send the role change complete message to the SgNB and channel quality of the SgNB is better than channel quality of the MgNB in that time because the trigger condition is satisfied. Thus, the handover or role change failure rate would be reduced.

According to the embodiment of FIG. 11, the MgNB does not know that the UE already trigger the role change complete message until the MgNB receives the role change complete message from the SgNB. So, the MgNB may send a RRC reconfiguration message for changing configuration in that short duration. Therefore, a RRC reconfiguration complete message with cause (e.g. "In progress") needs to be proposed according to an embodiment of the present invention.

Figure 12:
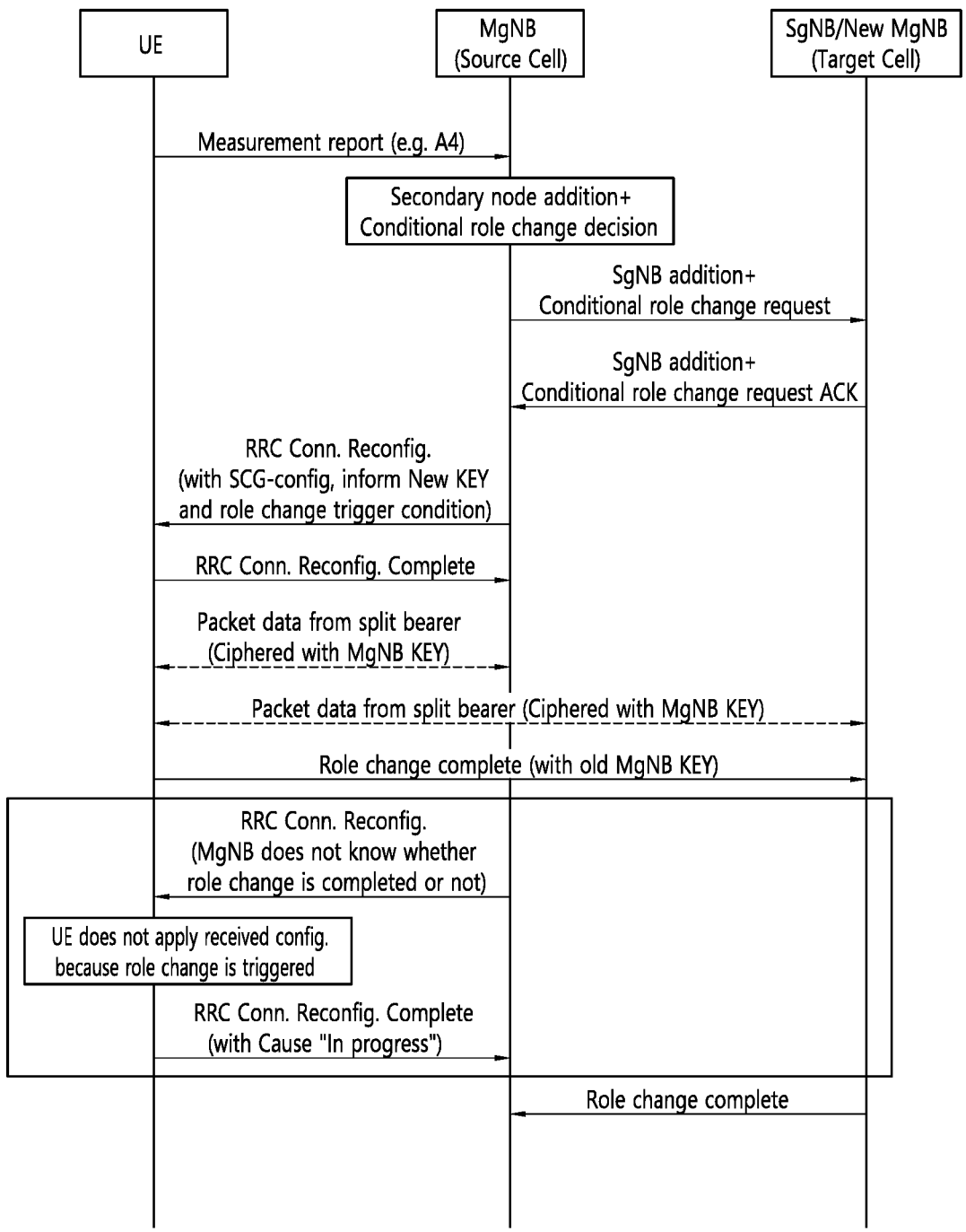
FIG. 12 shows a procedure for dual connectivity-based handover in case that the UE sends a role change complete message to a secondary base station, according to an embodiment of the present invention.

FIG. 12 shows a procedure for dual connectivity-based handover in case that the UE sends a role change complete message to a secondary base station, according to an embodiment of the present invention.

Referring to FIG. 12, the MgNB may send a RRC reconfiguration message for changing configuration after the UE sends a role change complete message. If the MgNB sends the RRC reconfiguration message for changing configuration, the UE would not apply the changed configuration and send a RRC reconfiguration complete message with cause (e.g. "In progress").

Figure 13:
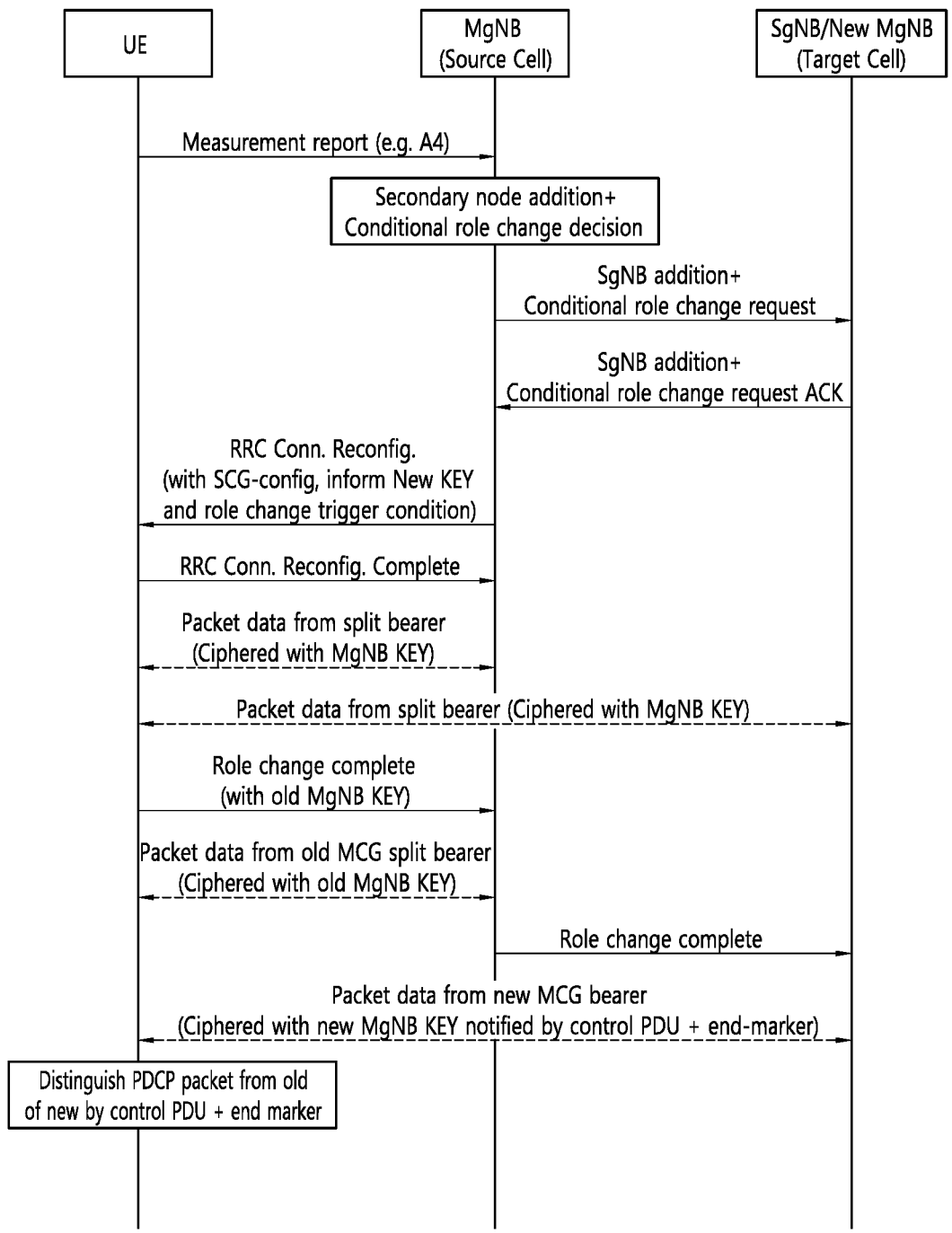
FIG. 13 shows a procedure for dual connectivity-based handover in case that the UE sends a role change complete message to a master base station, according to an embodiment of the present invention.

FIG. 13 shows a procedure for dual connectivity-based handover in case that the UE sends a role change complete message to a master base station, according to an embodiment of the present invention.

Referring to FIG. 13, the UE may send a role change complete message to the MgNB with MgNB security key when the trigger condition is satisfied. The MgNB may send a role change complete message to the SgNB. The SgNB becomes new MgNB and MgNB becomes new SgNB. In this case, the MgNB knows that the UE triggered the role change complete message. So, the MgNB does not send a RRC reconfiguration message for changing configurations after UE triggered the role change complete message. However, the UE may send the role change complete message to the MgNB which channel quality is worse than the SgNB. Thus, the handover or role change failure may be occurred and radio link failure (RLF) could be happened.

Figure 14:
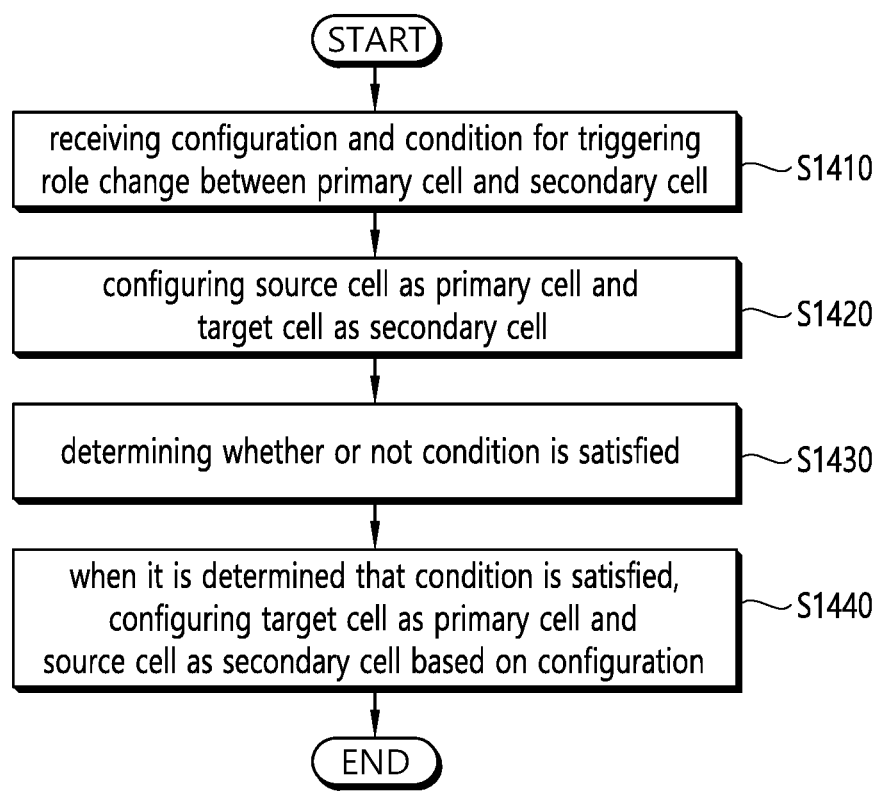
FIG. 14 shows a method for performing a role change between a primary cell and a secondary cell by a UE according to an embodiment of the present invention.

FIG. 14 shows a method for performing a role change between a primary cell and a secondary cell by a UE according to an embodiment of the present invention. The present invention described above for UE side may be applied to this embodiment.

Referring to FIG. 14, in step S1410, the UE may receive a configuration and a condition for triggering the role change between the primary cell and the secondary cell.

The configuration may include a first configuration for configuring the target cell as the secondary cell, and the target cell may be configured as the secondary cell based on the first configuration included in the configuration. Further, the configuration may include a second configuration for configuring the source cell as the secondary cell and the target cell as the primary cell. The second configuration may include a PDCP security key of the target cell.

The condition may include a difference value of channel quality between the primary cell and the secondary cell.

The condition for triggering the role change between the primary cell and the secondary cell and the configuration may be received from a master base station via the source cell. Alternatively, the condition for triggering the role change between the primary cell and the secondary cell and the configuration may be received from a secondary base station via a secondary cell other than the target cell. The condition for triggering the role change between the primary cell and the secondary cell and the configuration may be included in a RRC reconfiguration message.

In step S1420, the UE may configure a source cell as the primary cell and a target cell as the secondary cell.

In step S1430, the UE may determine whether or not the condition is satisfied. The UE may determine that the condition is satisfied based on the difference value of channel quality between the primary cell and the secondary cell. Specifically, for instance, the UE may determine that the condition is satisfied, when quality of the target cell is better than quality of the source cell by the difference value.

In step S1440, when it is determined that the condition is satisfied, the UE may configure the target cell as the primary cell and the source cell as the secondary cell based on the configuration.

Further, when it is determined that the condition is satisfied, the UE may transmit a role change complete message to a secondary base station via the target cell. Further, the UE may transmit a RRC reconfiguration complete message for informing a master base station that a role change is not completed, to the master base station, before the master base station receives a role change complete message from the secondary base station. Alternatively, when it is determined that the condition is satisfied, the UE may transmit a role change complete message to a master base station via the source cell.

According to an embodiment of the present invention, the UE can perform the DC based handover efficiently, so that signaling overhead between the UE and the base station can be reduced.

Figure 15:
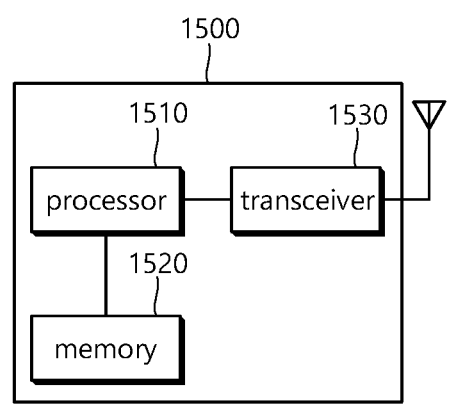
FIG. 15 shows a UE to implement an embodiment of the present invention.

FIG. 15 shows a UE to implement an embodiment of the present invention. The present invention described above for UE side may be applied to this embodiment.

A UE 1500 includes a processor 1510, a memory 1520 and a transceiver 1530. The processor 1510 may be configured to implement proposed functions, procedures and/or methods described in this description. Layers of the radio interface protocol may be implemented in the processor 1510.

Specifically, the processor 1510 may control the transceiver 1530 to receive a configuration and a condition for triggering the role change between the primary cell and the secondary cell.

The configuration may include a first configuration for configuring the target cell as the secondary cell, and the target cell may be configured as the secondary cell based on the first configuration included in the configuration. Further, the configuration may include a second configuration for configuring the source cell as the secondary cell and the target cell as the primary cell. The second configuration may include a PDCP security key of the target cell.

The condition may include a difference value of channel quality between the primary cell and the secondary cell.

The condition for triggering the role change between the primary cell and the secondary cell and the configuration may be received from a master base station via the source cell. Alternatively, the condition for triggering the role change between the primary cell and the secondary cell and the configuration may be received from a secondary base station via a secondary cell other than the target cell. The condition for triggering the role change between the primary cell and the secondary cell and the configuration may be included in a RRC reconfiguration message.

Further, the processor 1510 may configure a source cell as the primary cell and a target cell as the secondary cell.

Further, the processor 1510 may determine whether or not the condition is satisfied. The processor 1510 may determine that the condition is satisfied based on the difference value of channel quality between the primary cell and the secondary cell. Specifically, for instance, the processor 1510 may determine that the condition is satisfied, when quality of the target cell is better than quality of the source cell by the difference value.

Further, when it is determined that the condition is satisfied, the processor 1510 may configure the target cell as the primary cell and the source cell as the secondary cell based on the configuration.

Further, when it is determined that the condition is satisfied, the processor 1510 may control the transceiver 1530 to transmit a role change complete message to a secondary base station via the target cell. Further, the processor 1510 may control the transceiver 1530 to transmit a RRC reconfiguration complete message for informing a master base station that a role change is not completed, to the master base station, before the master base station receives a role change complete message from the secondary base station. Alternatively, when it is determined that the condition is satisfied, the processor 1510 may control the transceiver 1530 to transmit a role change complete message to a master base station via the source cell.

The memory 1520 is operatively coupled with the processor 1510 and stores a variety of information to operate the processor 1510. The transceiver 1530 is operatively coupled with the processor 1510, and transmits and/or receives a radio signal.

Figure 16:
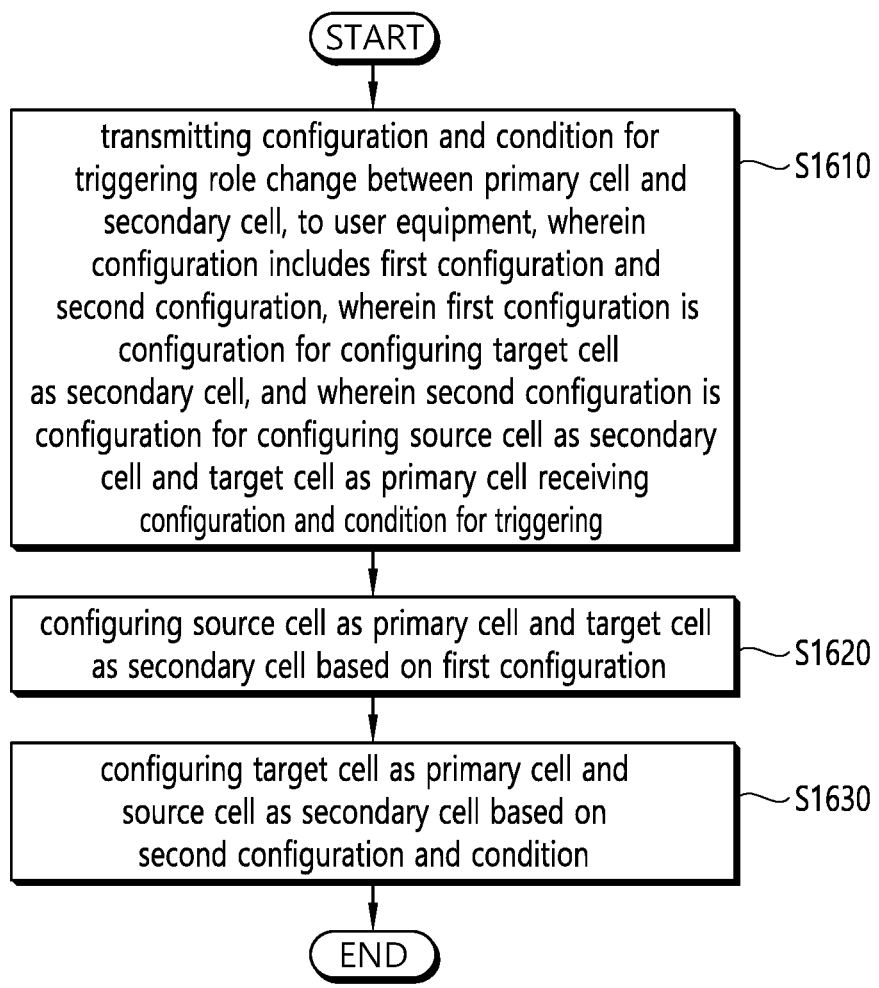
FIG. 16 shows a method for performing a role change between a primary cell and a secondary cell by a BS according to an embodiment of the present invention.

FIG. 16 shows a method for performing a role change between a primary cell and a secondary cell by a BS according to an embodiment of the present invention. The present invention described above for BS side may be applied to this embodiment.

Referring to FIG. 16, in step S1610, the base station may transmit a configuration and a condition for triggering the role change between the primary cell and the secondary cell, to a user equipment. The configuration may include a first configuration and a second configuration. The first configuration may be a configuration for configuring a target cell as the secondary cell, and the second configuration may be a configuration for configuring a source cell as the secondary cell and the target cell as the primary cell.

In step S1620, the base station may configure the source cell as the primary cell and the target cell as the secondary cell based on the first configuration.

In step S1630, the base station may configure the target cell as the primary cell and the source cell as the secondary cell based on the second configuration and the condition.

Figure 17:
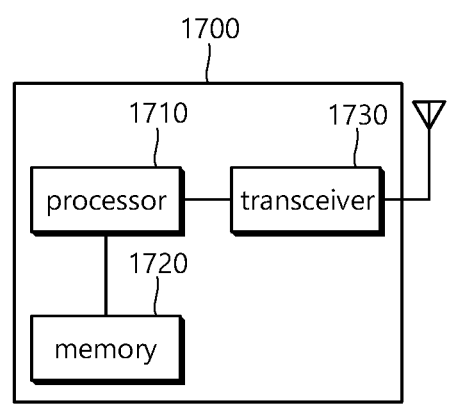
FIG. 17 shows a BS to implement an embodiment of the present invention.

FIG. 17 shows a BS to implement an embodiment of the present invention. The present invention described above for BS side may be applied to this embodiment.

A BS 1700 includes a processor 1710, a memory 1720 and a transceiver 1730. The processor 1710 may be configured to implement proposed functions, procedures and/or methods described in this description. Layers of the radio interface protocol may be implemented in the processor 1710.

Specifically, the processor 1710 may control the transceiver 1730 to transmit a configuration and a condition for triggering the role change between the primary cell and the secondary cell, to the transceiver 1530. The configuration may include a first configuration and a second configuration. The first configuration may be a configuration for configuring a target cell as the secondary cell, and the second configuration may be a configuration for configuring a source cell as the secondary cell and the target cell as the primary cell.

Further, the processor 1710 may configure the source cell as the primary cell and the target cell as the secondary cell based on the first configuration.

Further, the processor 1710 may configure the target cell as the primary cell and the source cell as the secondary cell based on the second configuration and the condition.

The memory 1720 is operatively coupled with the processor 1710 and stores a variety of information to operate the processor 1710. The transceiver 1730 is operatively coupled with the processor 1710, and transmits and/or receives a radio signal.

The processor 1510, 1710 may include an application-specific integrated circuit (ASIC), a separate chipset, a logic circuit, and/or a data processing unit. The memory 1520, 1720 may include a read-only memory (ROM), a random access memory (RAM), a flash memory, a memory card, a storage medium, and/or other equivalent storage devices. The transceiver 1530, 1730 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 1510, 1710. The memory 1520, 1720 may be located inside or outside the processor 1510, 1710, and may be coupled to the processor 1510, 1710 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing, by a user equipment (UE), a role change between a primary cell and a secondary cell in a wireless communication system, the method comprising:
   receiving, by the UE, a measurement configuration through a radio resource control (RRC) reconfiguration, from a source cell;
   performing, by the UE, a measurement based on the measurement configuration received from the source cell;
   transmitting, by the UE, measurement information informing the measurement based on the measurement configuration received from the source cell, to the source cell,
   wherein the measurement information informing the measurement based on the measurement configuration is based on at least one synchronization signal (SS) and physical broadcast channel (PBCH) block or based on at least one channel state information reference signal (CSI-RS) resource;
   receiving, by the UE, a configuration for configuring the source cell as the secondary cell and the target cell as the primary cell and a condition for triggering the role change between the primary cell and the secondary cell,
   wherein the configuration includes a PDCP security key of the target cell and the condition includes a difference value of channel quality between the primary cell and the secondary cell;
   configuring, by the UE, a source cell as the primary cell and a target cell as the secondary cell;
   determining, by the UE, whether or not the condition is satisfied;
   based on determining that the condition is satisfied, configuring, by the UE, the target cell as the primary cell and the source cell as the secondary cell based on the configuration; and
   transmitting, by the UE, a message including (i) a first information informing the configuring based on the configuration and (ii) a second information including a PDCP security key of the source cell, toward the target cell or toward the source cell.

2. The method of claim 1, wherein the configuration includes a first configuration for configuring the target cell as the secondary cell.

3. The method of claim 2, wherein the target cell is configured as the secondary cell based on the first configuration included in the configuration.

4. The method of claim 1, wherein the configuration includes a second configuration for configuring the source cell as the secondary cell and the target cell as the primary cell.

5. The method of claim 1, wherein it is determined that the condition is satisfied based on the difference value of channel quality between the primary cell and the secondary cell.

6. The method of claim 1, wherein it is determined that the condition is satisfied, based on being better quality of the target cell than quality of the source cell by the difference value.

7. The method of claim 1, wherein the condition for triggering the role change between the primary cell and the secondary cell and the configuration are received from a master base station via the source cell.

8. The method of claim 1, further comprising:
   based on determining that the condition is satisfied, transmitting a role change complete message to a secondary base station via the target cell.

9. The method of claim 8, further comprising:
   transmitting a RRC reconfiguration complete message for informing a master base station that a role change is not completed, to the master base station, before the master base station receives a role change complete message from the secondary base station.

10. The method of claim 1, further comprising:
    based on determining that the condition is satisfied, transmitting a role change complete message to a master base station via the source cell.

11. The method of claim 1, wherein the condition for triggering the role change between the primary cell and the secondary cell and the configuration are included in a RRC reconfiguration message.

12. An apparatus configured to control a user equipment, UE, performing a role change between a primary cell and a secondary cell in a wireless communication system, the apparatus comprising:
    at least one processor; and
    at least one computer memory operably connectable to the at least one processor and storing instructions,
    wherein the at least one processor execute the instructions to:
    receive, by the UE, a measurement configuration through a radio resource control (RRC) reconfiguration, from a source cell;
    perform, by the UE, a measurement based on the measurement configuration received from the source cell;

transmit, by the UE, measurement information informing the measurement based on the measurement configuration received from the source cell, to the source cell, wherein the measurement information informing the measurement based on the measurement configuration is based on at least one synchronization signal (SS) and physical broadcast channel (PBCH) block or based on at least one channel state information reference signal (CSI-RS) resource;

receive, by the UE, a configuration for configuring the source cell as the secondary cell and the target cell as the primary cell and a condition for triggering the role change between the primary cell and the secondary cell, wherein the configuration includes a PDCP security key of the target cell and the condition includes a difference value of channel quality between the primary cell and the secondary cell;

configure, by the UE, a source cell as the primary cell and a target cell as the secondary cell;

determine, by the UE, whether or not the condition is satisfied;

based on determining that the condition is satisfied, configuring, by the UE, the target cell as the primary cell and the source cell as the secondary cell based on the configuration; and transmit, by the UE, a message including (i) a first information informing the configuring based on the configuration and (ii) a second information including a PDCP security key of the source cell, toward the target cell or toward the source cell.

13. A user equipment (UE) for performing a role change between a primary cell and a secondary cell in a wireless communication system, the UE comprising:

at least one transceiver;

at least one processor; and at least one computer memory operably connectable to the at least one processor and storing instructions that, when executed, cause the at least one processor to perform operations comprising:

control the at least one transceiver to receive, by the UE, a measurement configuration through a radio resource control (RRC) reconfiguration, from a source cell;

control the at least one transceiver to perform, by the UE, a measurement based on the measurement configuration received from the source cell;

control the at least one transceiver to transmit, by the UE, measurement information informing the measurement based on the measurement configuration received from the source cell, to the source cell, wherein the measurement information informing the measurement based on the measurement configuration is based on at least one synchronization signal (SS) and physical broadcast channel (PBCH) block or based on at least one channel state information reference signal (CSI-RS) resource;

control the at least one transceiver to receive a configuration and a condition for triggering the role change between the primary cell and the secondary cell;

control the at least one transceiver to configure a source cell as the primary cell and a target cell as the secondary cell;

control the at least one transceiver to determine whether or not the condition is satisfied; and based on determining that the condition is satisfied, cause the at least one processor to configure the target cell as the primary cell and the source cell as the secondary cell based on the configuration; and control the at least one transceiver to transmit, a message including (i) a first information informing the configuring based on the configuration and (ii) a second information including a PDCP security key of the source cell, toward the target cell or toward the source cell.

* * * * *